United States Patent
Shelest et al.

(10) Patent No.: US 7,406,527 B2
(45) Date of Patent: Jul. 29, 2008

(54) METHOD FOR ADVANCE NEGOTIATION OF COMPUTER SETTINGS

(75) Inventors: Art Shelest, Redmond, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 10/002,265

(22) Filed: Nov. 2, 2001

(65) Prior Publication Data
US 2003/0088770 A1    May 8, 2003

(51) Int. Cl.
*G06F 15/16* (2006.01)
*G06F 11/00* (2006.01)

(52) U.S. Cl. .......................... 709/228; 370/231
(58) Field of Classification Search ......... 709/227–229, 709/248, 220–222, 230–237; 370/465, 468, 370/477, 231
See application file for complete search history.

(56) References Cited

U.S. PATENT DOCUMENTS

| | | | | |
|---|---|---|---|---|
| 6,038,216 A * | 3/2000 | Packer | | 370/231 |
| 6,219,713 B1 * | 4/2001 | Ruutu et al. | | 709/235 |
| 6,301,249 B1 * | 10/2001 | Mansfield et al. | | 370/394 |
| 6,473,793 B1 * | 10/2002 | Dillon et al. | | 709/223 |
| 6,603,741 B1 * | 8/2003 | Poulter et al. | | 370/252 |
| 6,711,137 B1 * | 3/2004 | Klassen et al. | | 370/252 |
| 6,741,563 B2 * | 5/2004 | Packer | | 370/231 |
| 6,865,609 B1 * | 3/2005 | Gubbi et al. | | 709/230 |
| 6,871,248 B2 * | 3/2005 | Riley | | 710/106 |
| 6,925,502 B1 * | 8/2005 | Abbasi et al. | | 709/232 |
| 6,977,945 B1 * | 12/2005 | Noda et al. | | 370/468 |
| 7,006,526 B1 * | 2/2006 | Biederman | | 370/252 |
| 7,023,876 B2 * | 4/2006 | Berry et al. | | 370/465 |
| 7,120,792 B1 * | 10/2006 | Jacobson et al. | | 713/153 |
| 7,131,008 B1 * | 10/2006 | Liu et al. | | 713/182 |
| 7,133,361 B2 * | 11/2006 | Olariu et al. | | 370/230 |
| 2002/0035681 A1 * | 3/2002 | Maturana et al. | | 713/151 |
| 2002/0112057 A1 * | 8/2002 | Srinivas et al. | | 709/226 |
| 2003/0128711 A1 * | 7/2003 | Olariu et al. | | 370/401 |
| 2004/0032846 A1 * | 2/2004 | Rasanen et al. | | 370/338 |
| 2004/0148382 A1 * | 7/2004 | Narad et al. | | 709/223 |
| 2004/0243853 A1 * | 12/2004 | Swander et al. | | 713/201 |
| 2005/0091527 A1 * | 4/2005 | Swander et al. | | 713/201 |
| 2005/0265346 A1 * | 12/2005 | Ho et al. | | 370/392 |

(Continued)

OTHER PUBLICATIONS

Dandalis et al., "An Adaptive Cryptographic Engine for IPSec Architectures," 2000, IEEE, 2000 IEEE Symposium on Field-Programmable Custom Computing Machines, pp. 132-141.*

(Continued)

*Primary Examiner*—Nathan J. Flynn
*Assistant Examiner*—J. Bret Dennison
(74) *Attorney, Agent, or Firm*—Wolf, Greenfield & Sacks, P.C.

(57) ABSTRACT

A method to negotiate computer settings in advance is presented. A prediction is made to determine if the computer setting will be needed, and if needed, whether a value outside of a normal range of values will be needed. A value for the computer setting that is outside of the normal range of values is determined and the value is set to the outside value. A value within the normal range of values is used if it was predicted that there is no need for a value outside of the normal range of values.

2 Claims, 3 Drawing Sheets

U.S. PATENT DOCUMENTS

2007/0136591 A1* 6/2007 Shelest et al. ............... 713/171
2008/0075000 A1* 3/2008 Robbins .................... 370/229

OTHER PUBLICATIONS

W. Stevens, "RFC 2001—TCP Slow Start, Congestion Avoidance, Fast Retransmit, and Fast Recovery Algorithms", Jan. 1997.*

D. Harkins et al., RFC 2409—The Internet Key Exchange (IKE), Nov. 1998.*

V. Jacobson, "RFC 1323—TCP Extensions for High Performance", May 1992.*

Jacobson et al., RFC 1323 (rfc1323)—TCP Extensions for High Performance, May 1992.*

*Transmission Control Protocol, DARPA Internet Program Protocol Specification*; Information Sciences Institute; at http://www.ietf.org/rfc/rfc0793.txt?number=793, (last visited May 21, 2001).

Van Jacobson et al.; *TCP Extensions for High Performance*; at http://www.ietf.org/rfc/rfc1323.txt?number=1323; (last visited May 21, 2001).

* cited by examiner

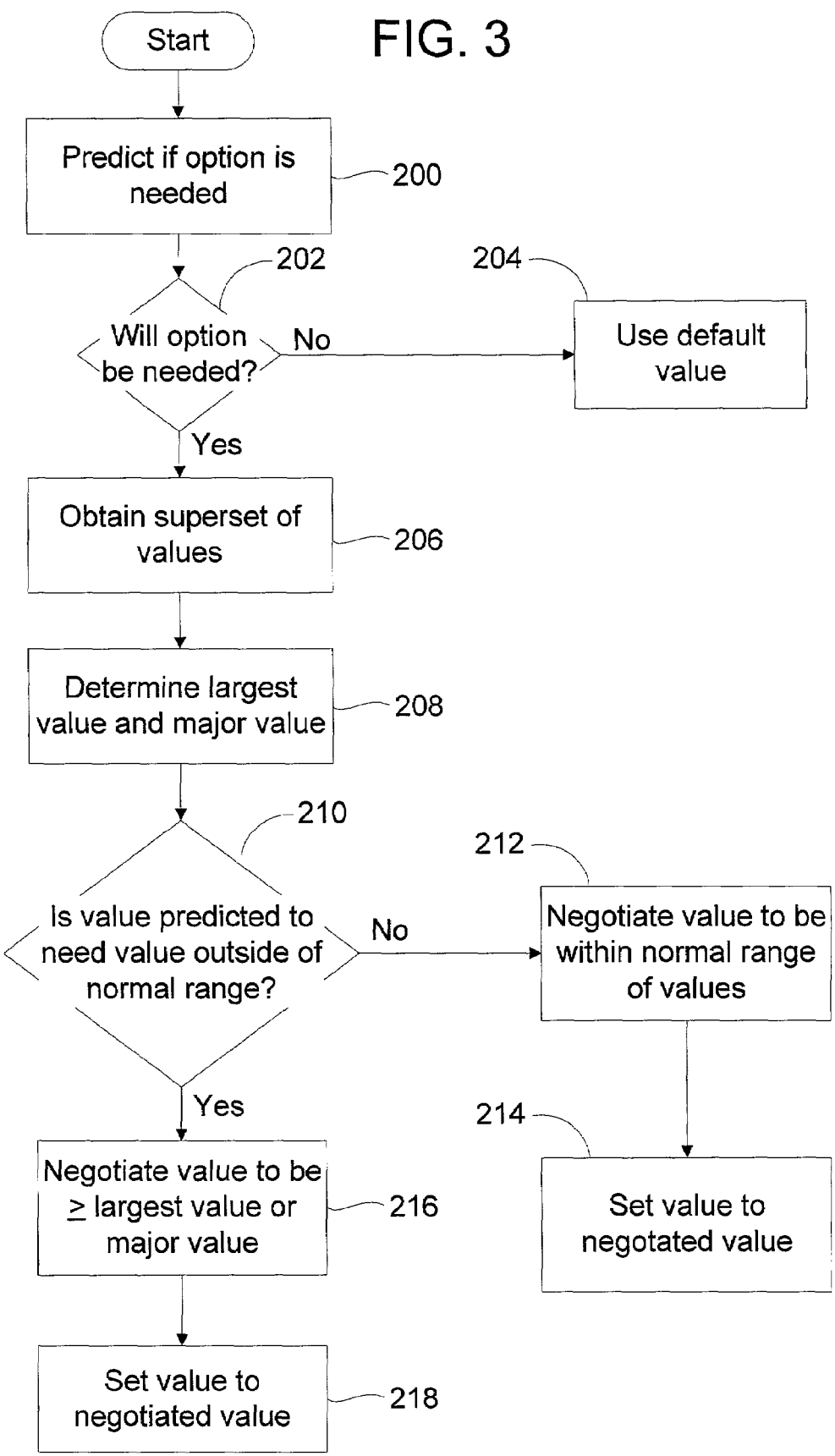

METHOD FOR ADVANCE NEGOTIATION OF COMPUTER SETTINGS

FIELD OF THE INVENTION

This invention relates generally to networked communications and, more particularly, relates to a method for predicting and negotiating parameters that can not be changed during operation.

BACKGROUND OF THE INVENTION

Computer systems are being developed with ever increasing complexity. Computers acquired solely for word processing now come with software that provides paging, scheduling, window management, and device management. Networked computers and workstations also have multiple network protocols, multiple file systems, and multiple application program interfaces.

Several problems have been encountered with the increased complexity of computer systems. One problem is that programs designed for a particular machine may not work efficiently, if at all, on other machines. Many of these programs require computer settings to be set in order for the program to function. A computer setting is a program setting or operating system setting that is used to configure the program or operating system. The computer settings are often manually configured in an effort to get the program to work. The manual configuration is done by trial and error by tweaking settings incrementally to see if an incremental change is sufficient for what is needed. Once the program works, no more tweaking is done.

Another problem is that many settings can not be changed during operation and must be selected prior to operation. A user often does not know which value should be selected to use for a particular setting. In these instances, the user selects a value and sees if the operation will work. If it does not work, the value is changed by stopping the operation, changing the value, and restarting (e.g., re-booted) the operation every time the setting is tweaked.

A further problem occurs when settings are negotiated between two or more systems. Settings are negotiated based on each system's needs at the time of negotiation. These systems are often stuck with the negotiated settings when the protocol being used prohibits renegotiation.

BRIEF SUMMARY OF THE INVENTION

The present invention provides a method to set a computer setting. A normal range of values used for the computer setting is determined. The largest value and a major value within the range of values are determined. A major value is a value that is above the values that a majority of applications use. The computer setting is set to a value that is equal to or greater than either the largest value or the major value.

The present invention also predicts if the computer setting will be needed for optional computer settings and predicts if the computer setting will need a value outside the normal range of values. The computer setting is set to a value outside the normal range of values if the computer setting is predicted to need a value outside the normal range.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 illustrates a flow chart of a method of setting a computer setting in accordance with the present invention.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
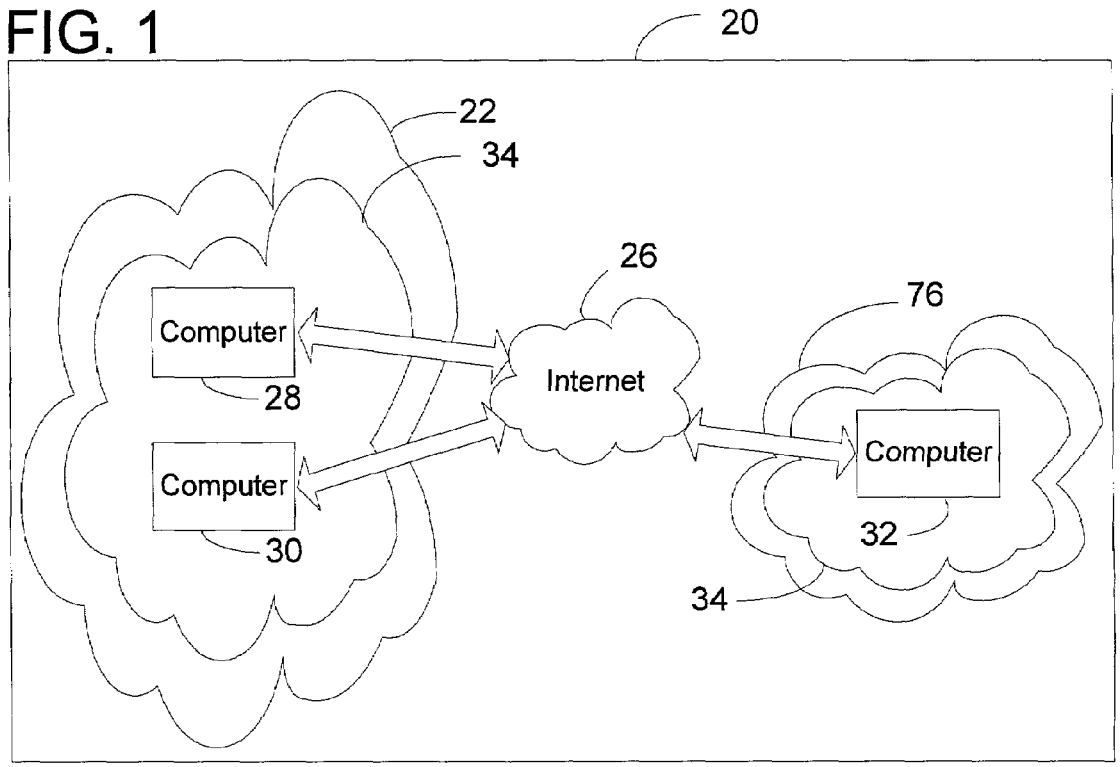
FIG. 1 is a block diagram illustrating a network system having a plurality of networks connected by a transport in which the present invention operates.

Turning to the drawings, wherein like reference numerals refer to like elements, the invention is illustrated as being implemented in a suitable networking environment such as the network system environment 20 illustrated in FIG. 1. The network system environment 20 is only one example of a suitable computing environment and is not intended to suggest any limitation as to the scope of use or functionality of the invention. For example, the invention can also be used in wireless systems.

The exemplary network system 20 includes local sub-networks 22, 24 connected to each other by network 26. Network 26 may be a virtual private network, a LAN, a WAN, the Internet, and the like. Local sub-network 22 has general purpose computing devices in the form of computers 28, 30, and local sub-network 24 has computer 32. The network system 20 may have additional local sub-networks and local sub-networks 22, 24 may have additional computers. Each sub-network 22, 24 is served by a transport provider 34, such as TCP/IP, for providing communication between computers and between applications residing on computers.

Figure 2:
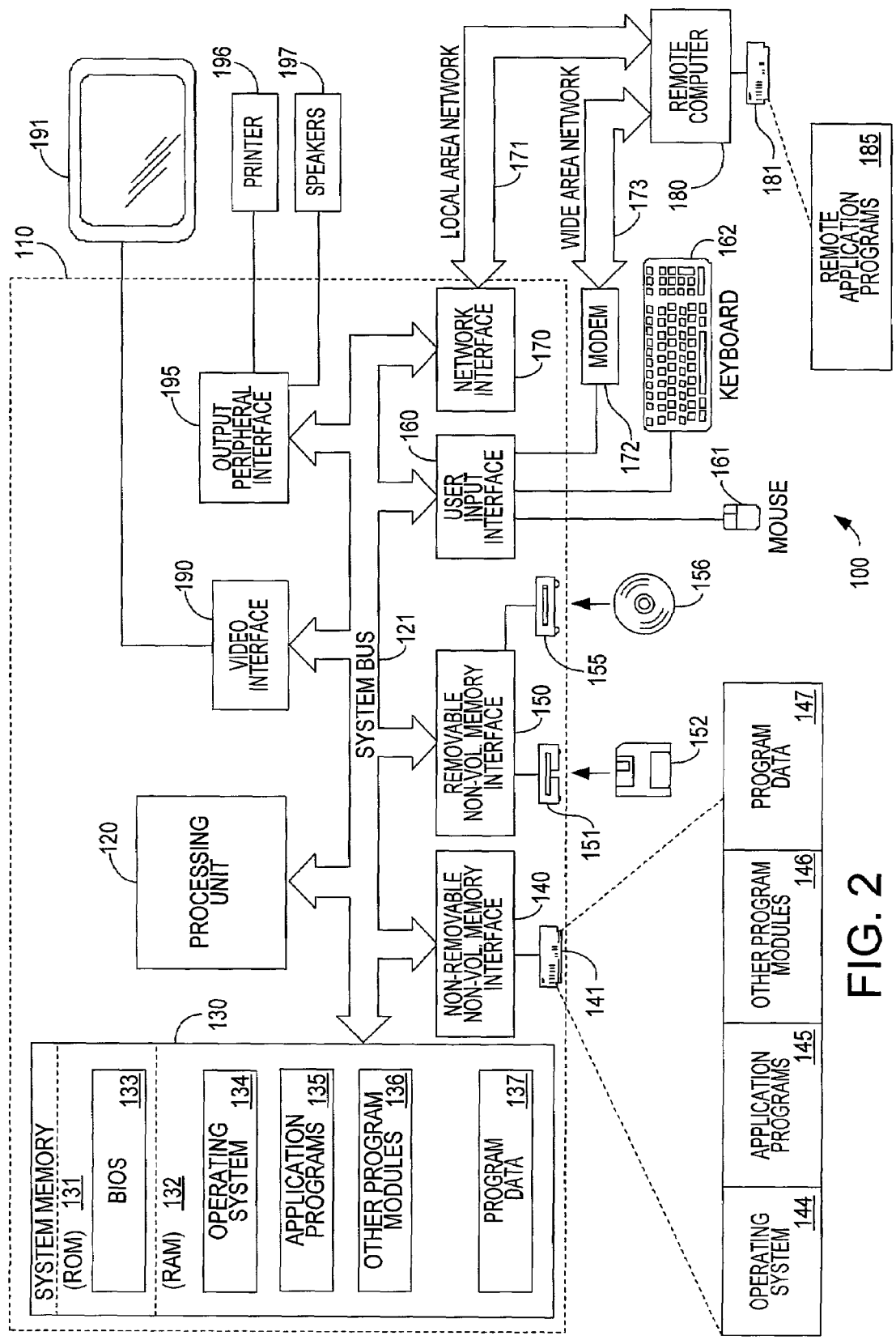
FIG. 2 is a block diagram generally illustrating an exemplary computer system on which the present invention resides.

FIG. 2 illustrates an example of a suitable computing system environment on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. It should be noted that computers 28, 30, 32 are similar to computer 110 and have similar components. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. For purposes of illustration, application program 135 shall perform the steps of the present invention. It will be appreciated that operating systems 124, 144, other program modules 136, 146, application programs 145 and remote application programs 185 and program modules stored on removable, nonvolatile magnetic disk 152 and removable, nonvolatile optical disk 156 also may perform the steps of the present invention.

Turning now to the flow diagram of FIG. 3, the steps taken to negotiate and set a computer setting are illustrated. These steps are stored on computer readable media as described hereinabove. Application program 135 predicts if an option will be needed (step 200). For example, if an Internet session (e.g., a transmission control protocol/Internet protocol (TCP/IP) connection) is being established, a secure connection using IPSec or other security protocol may be needed for the session. Based on previous Internet sessions, the application program 135 determines the likelihood that a secure connection will be needed. The prediction is made based on the likelihood that a secure connection will be needed. The step of predicting if the option will be needed includes the step of predicting if the value needed will be outside of a normal range of values. If the option will not be needed (step 202), the application program uses default settings (step 204). The default settings are the initial settings that are used for a particular computer setting.

If the option is predicted to be needed, a superset of values is obtained (step 206). The superset of values is a set of values that have typically been used for the computer setting. For example, a window size is the amount of data a sender (e.g., a sending application, a transport protocol. etc.) can send on a particular connection before it gets an acknowledgment back from the receiver that the receiver has received some of the data. The default window size in many operating systems is zero to 64 kB. A window scaling factor is a value that is used to change the window size. Changing a window scaling factor from a value of one to a value of two allows twice the amount of data to be sent (e.g., 1 to 128 kB) before a sender has to stop and wait for an acknowledgment from the receiver that some or all of the data has been received before sending any more data. The superset of window scaling factor values would be the values typically used (e.g., 1, 2, 4, 8, 16).

The largest value and major value are determined (step 208). As previously indicated, the major value is a value that is above the values that a majority of applications use. The major value and the large value may be equal to each other. If the value is predicted to need a value within the normal range of values (step 210), a value that is within the normal range of values is negotiated for the computer settings that must be negotiated with another application, operating system, program module and the like (step 212). The normal range of values is the range of values typically used for the operating system setting or the range of values typically used for a majority of applications. If the computer setting does not need to be negotiated, the value is set to a value within the normal range of values.

If the value is predicted to need a value outside the normal range of values, a value is negotiated that is greater than or equal to the largest value or the major value (step 216). The value is then set to the negotiated value (step 218). If the computer setting does not need to be negotiated, the value is set to a value that is greater than or equal to the largest value or the major value. In one embodiment, the value negotiated or set probabilistically covers the widest range of values that an application might use.

A typical situation where the present invention is used is in establishing TCP/IP (Transmission Control Protocol/Internet Protocol) connections. There are many options that can be used with a TCP/IP connection. These options include the window scaling factor, whether time stamps are to be used, and whether a secure connection is to be used. The present invention predicts if the option will be needed and sets or negotiates the setting of each option. The largest value and major value for the normal range of values for the window scaling factor is determined if the window scale factor is needed. In one embodiment, the value that is outside the normal range of values is chosen to be 256. The window can range in size from 256 bytes to 17 MB in increments of 256 with a value of 256 as opposed to a range of 1 byte to 64 kB in increments of 1 with a value of 1. A value of 256 improves the scale in which the window can be varied. Additionally, the value of 256 does not affect network communications because a network packet size (i.e., the size of a message sent in a network) is greater than 256. Values for time stamp options and security options are similarly chosen.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to negotiate an option for a window scaling factor in a computer environment comprising the steps of:
   predicting if the option will be needed;
   if the option is predicted to be needed, predicting if the option will need a value outside of a normal range of values comprising values of 1-16 bytes of the window scaling factor, wherein values outside of the normal range of values include a largest value and a major value, with the major value being a value that is greater than values that a majority of applications use:
     if the option is predicted to need the value outside of the normal range of values:
       determining an outside setting of the window scaling factor that is outside of the normal range of values to provide the option with the outside setting;
       if the outside setting of the window scaling factor comprises a value greater than or equal to one of the largest value and the major value, providing the option with the value greater than or equal to one of the largest value and the major value, wherein the value comprises a value of 256 of the window scaling factor; and
     if the option is not predicted to need the value outside of the normal range of values:
       setting a value needed by the option to a normal setting within the normal range of values; and
   if the option is predicted not to be needed, setting the window scaling factor to a default value.

2. A computer readable storage medium encoded with computer executable instructions for negotiating an option for a window scaling factor in a computer environment, the computer executable instructions performing the steps comprising:
   predicting if the option will be needed;
   if the option is predicted to be needed, predicting if the option will need a value outside of a normal range of values comprising values of 1-16 bytes of the window scaling factor, wherein values outside of the normal range of values include a largest value and a major value, with the major value being a value that is greater than values that a majority of applications use:
     if the option is predicted to need the value outside of the normal range of values:
       determining an outside setting of the window scaling factor that is outside of the normal range of values to provide the option with the outside setting;
       if the outside setting of the window scaling factor comprises a value greater than or equal to one of the largest value and the major value, providing the option with the value greater than or equal to one of the largest value and the major value, wherein the value comprises a value of 256 of the window scaling factor; and
     if the option is not predicted to need the value outside of the normal range of values:
       setting a value needed by the option to a normal setting within the normal range of values; and
   if the option is predicted not to be needed, setting the window scaling factor to a default value.

* * * * *